United States Patent
Stewart et al.

(10) Patent No.: US 10,386,931 B2
(45) Date of Patent: Aug. 20, 2019

(54) TOGGLING BETWEEN PRESENTATION AND NON-PRESENTATION OF REPRESENTATIONS OF INPUT

(71) Applicant: Lenovo (Singapore) Pte. Ltd., New Tech Park (SG)

(72) Inventors: Aaron Michael Stewart, Raleigh, NC (US); Jonathan Jen-Wei Yu, Raleigh, NC (US); Thomas Ryan Cook, Raleigh, NC (US); Jeffrey E. Skinner, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 358 days.

(21) Appl. No.: 15/007,344

(22) Filed: Jan. 27, 2016

(65) Prior Publication Data
US 2017/0212643 A1    Jul. 27, 2017

(51) Int. Cl.
| G06F 3/01 | (2006.01) |
|---|---|
| G06F 3/0488 | (2013.01) |
| G06F 3/0484 | (2013.01) |
| G06F 3/16 | (2006.01) |

(52) U.S. Cl.
CPC ............. *G06F 3/017* (2013.01); *G06F 3/013* (2013.01); *G06F 3/0484* (2013.01); *G06F 3/0488* (2013.01); *G06F 3/167* (2013.01)

(58) Field of Classification Search
CPC combination set(s) only.
See application file for complete search history.

(56) References Cited

U.S. PATENT DOCUMENTS

| 5,717,879 | A | * | 2/1998 | Moran ................ G06F 9/45512 |
|---|---|---|---|---|
| | | | | 707/999.002 |
| 6,118,888 | A | * | 9/2000 | Chino .................... G06F 3/011 |
| | | | | 382/118 |
| 2008/0165255 | A1 | | 7/2008 | Christie et al. |
| 2010/0289825 | A1 | | 11/2010 | Shin et al. |
| 2011/0001628 | A1 | | 1/2011 | Miyazawa et al. |
| 2011/0007029 | A1 | | 1/2011 | Ben-David |
| 2012/0268391 | A1 | | 10/2012 | Somers |
| 2013/0100162 | A1 | | 4/2013 | Iseri |
| 2013/0177296 | A1 | | 7/2013 | Geisner et al. |

(Continued)

OTHER PUBLICATIONS

Galitz, The Essential Guide to User Interface Design), 2002, John Wiley and Sons, 2nd edition, pp. 589-617 (Year: 2002).*

(Continued)

*Primary Examiner* — Stella Higgs
(74) *Attorney, Agent, or Firm* — John L. Rogitz; John M. Rogitz

(57) ABSTRACT

In one aspect, a device includes a processor, a display accessible to the processor, and storage accessible to the processor. The storage bears instructions executable by the processor to present a user interface (UI) on the display and present at least a first option on the display and a second option on the display. The first option is selectable to present at the device, at least a first representation of first user input of a first input type. The second option is selectable to present, at the device, at least a second representation of second user input of a second input type. The first user input and the second user input pertain to the UI, and the first input type is different from the second input type.

20 Claims, 6 Drawing Sheets

(56) References Cited

U.S. PATENT DOCUMENTS

| | | | |
|---|---|---|---|
| 2013/0236093 A1 | 9/2013 | Gatt et al. | |
| 2013/0297206 A1 | 11/2013 | Heng et al. | |
| 2014/0013234 A1 | 1/2014 | Beveridge et al. | |
| 2014/0089847 A1 | 3/2014 | Seo et al. | |
| 2014/0168277 A1 | 6/2014 | Ashley et al. | |
| 2014/0237381 A1* | 8/2014 | Socolof | G06Q 10/02 715/752 |
| 2014/0362119 A1 | 12/2014 | Freund et al. | |
| 2015/0378665 A1 | 12/2015 | Han | |
| 2016/0283455 A1* | 9/2016 | Mardanbegi | G06F 17/241 |

OTHER PUBLICATIONS

Thomas Ryan Cook, Jeffrey E. Skinner, Aaron Michael Stewart, Jonathan Jen-Wei Yu, "Zooming and Panning Within a User Interface", related U.S. Appl. No. 14/818,120, Applicant's response to Non-Final Office Action filed Aug. 16, 2017.

Thomas Ryan Cook, Jeffrey E. Skinner, Aaron Michael Stewart, Jonathan Jen-Wei Yu, "Zooming and Panning Within a User Interface", related U.S. Appl. No. 14/818,120, Final Office Action dated Mar. 6, 2017.

Thomas Ryan Cook, Jeffrey E. Skinner, Aaron Michael Stewart, Jonathan Jen-Wei Yu, "Zooming and Panning Within a User Interface", file history of related U.S. Appl. No. 14/818,120, filed Aug. 4, 2016.

Unknown Author: Warcraft Orc & Humans, Copyright 1994-1995, Blizzard Entertainment, pp. 1-15.

Thomas Ryan Cook, Jeffrey E. Skinner, Aaron Michael Stewart, Jonathan Jen-Wei Yu, "Zooming and Panning Within a User Interface", related U.S. Appl. No. 14/818,120, Non-Final Office Action dated Jun. 1, 2017.

Thomas Ryan Cook, Jeffrey E. Skinner, Aaron Michael Stewart, Jonathan Jen-Wei Yu, "Zooming and Panning Within a User Interface", related U.S. Appl. No. 14/818,120, Applicant's response to Final Office Action filed Feb. 12, 2018.

Thomas Ryan Cook, Jeffrey E. Skinner, Aaron Michael Stewart, Jonathan Jen-Wei Yu, "Zooming and Panning Within a User Interface", related U.S. Appl. No. 14/818,120, Applicant's response to Final Office Action filed May 19, 2017.

Thomas Ryan Cook, Jeffrey E. Skinner, Aaron Michael Stewart, Jonathan Jen-Wei Yu, "Zooming and Panning Within a User Interface", related U.S. Appl. No. 14/818,120, Final Office Action dated Nov. 16, 2017.

Thomas Ryan Cook, Jeffrey E. Skinner, Aaron Michael Stewart, Jonathan Jen-Wei Yu, "Zooming and Panning Within a User Interface", related U.S. Appl. No. 14/818,120, Non-Final Office Action dated Aug. 11, 2016.

Thomas Ryan Cook, Jeffrey E Skinner, Aaron Michael Stewart, Jonathan Jen-Wei Yu, "Zooming and Panning Within a User Interface", related U.S. Appl. No. 15/007,344, Applicant's response to Non-Final Office Action filed Nov. 10, 2016.

* cited by examiner ly to toggling
TOGGLING BETWEEN PRESENTATION AND NON-PRESENTATION OF REPRESENTATIONS OF INPUT

FIELD

The present application relates general between presentation and non-presentation of representations of input.

BACKGROUND

As recognized herein, different users sometimes collaborate in virtual collaboration environments. Changes that are made to a virtual collaboration environment may be made by and viewable to all users, but it is often difficult if not impossible to determine which user made which change. As also recognized herein, when the users are working on the virtual collaboration environment remotely from each other, much of one user's interaction with the virtual collaboration environment may not be fully appreciated by the other users.

SUMMARY

Accordingly, in one aspect a device includes a processor, a display accessible to the processor, and storage accessible to the processor. The storage bears instructions executable by the processor to present a user interface (UI) on the display and present at least a first option on the display and a second option on the display. The first option is selectable to present, at the device, at least a first representation of first user input of a first input type. The second option is selectable to present, at the device, at least a second representation of second user input of a second input type. The first user input and the second user input pertain to the UI, and the first input type is different from the second input type.

In another aspect, a method includes presenting a user interface (UI) on a display of a device and toggling between presentation of representations of input at the device and non-presentation of the representations of input at the device. The toggling is based on manipulation of at least one selector presented on the display, and the input that is represented is associated with the UI.

In still another aspect, an apparatus includes a first processor, a network adapter, and storage. The storage bears instructions executable by a second processor for presenting a window on a display of a device accessible to the second processor, presenting at least a first selector on the display, and presenting a second selector on the display. The first selector is selectable to present, at the device, at least a first representation of first user input from a first user. The second selector is selectable to present, at the device, at least a second representation of second user input from a second user different from the first user. The first user input and the second user input pertain to content presented in the window. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
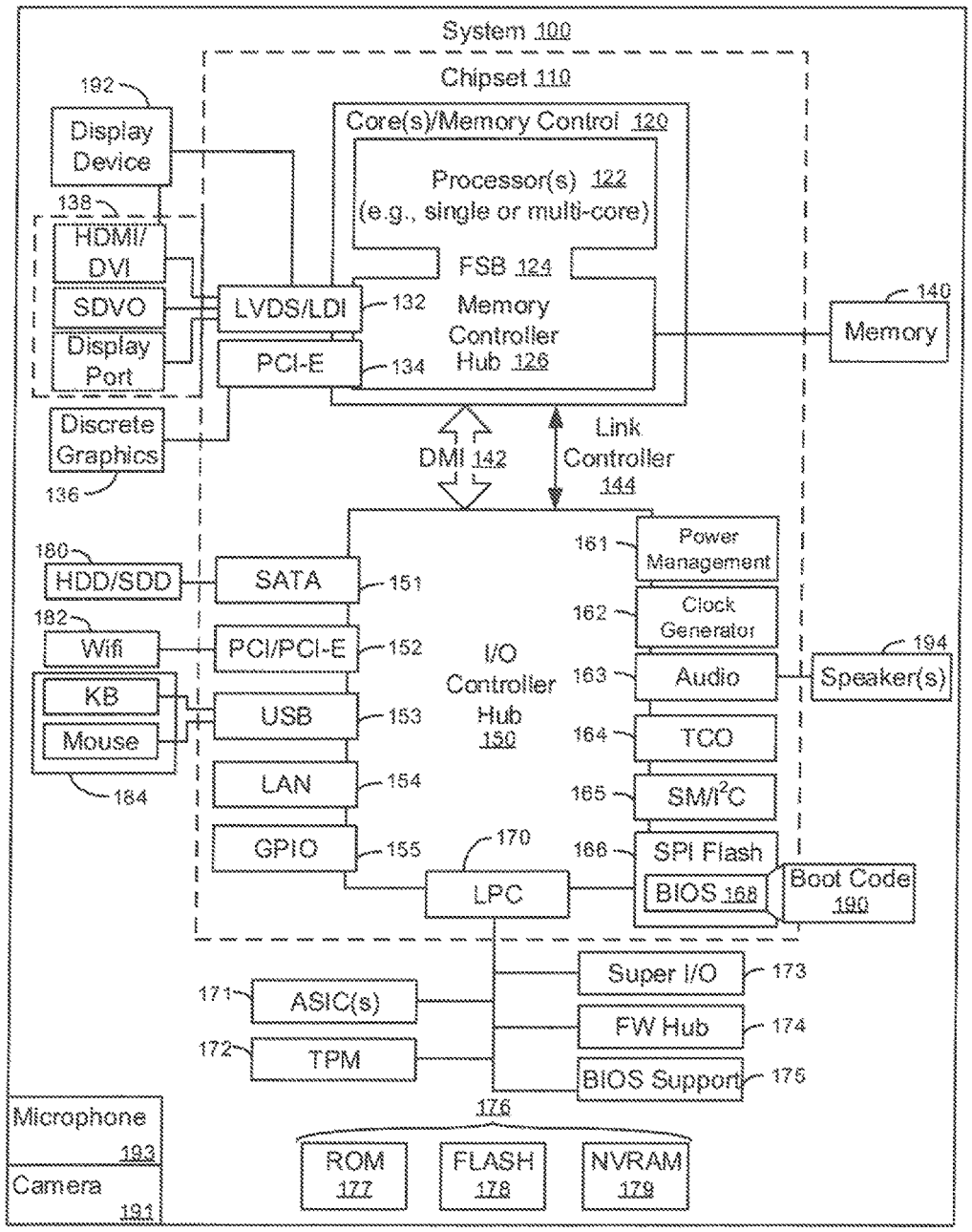
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices, including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the Think Station®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

Figure 5:
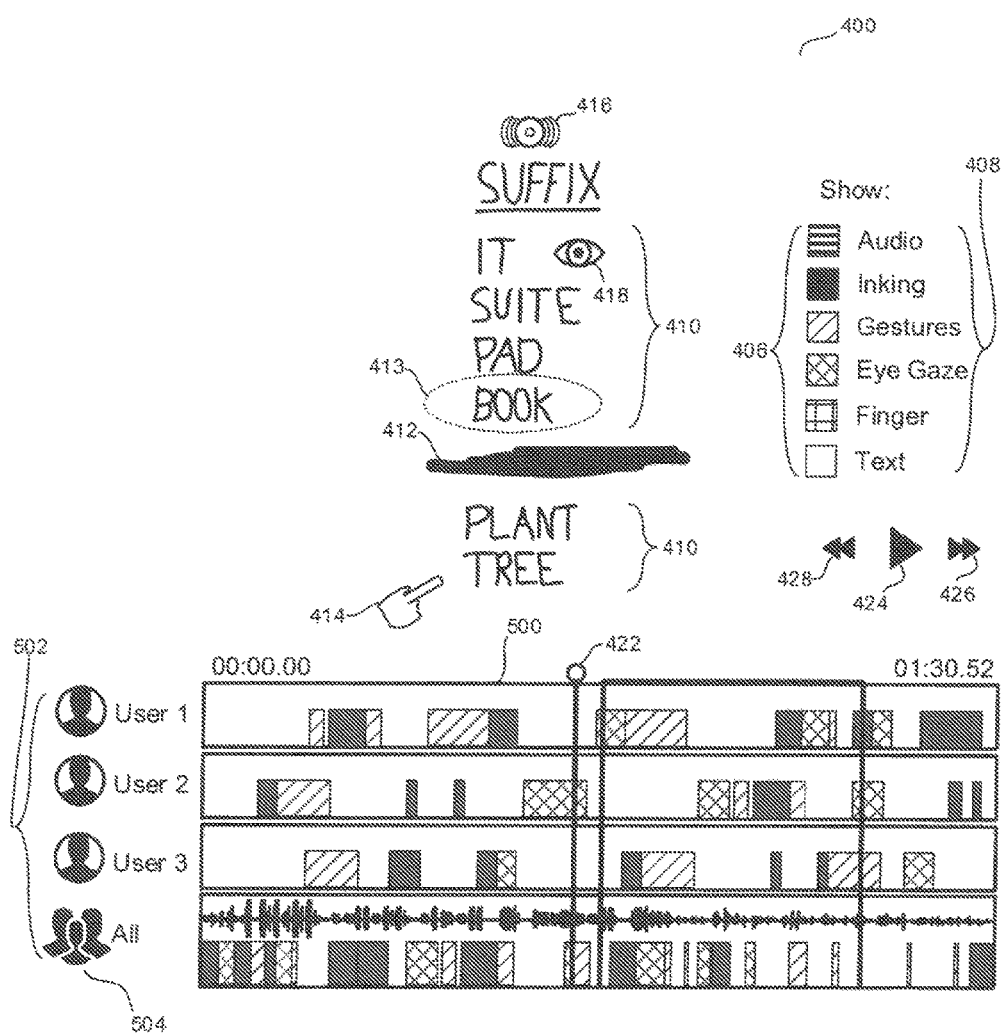

As shown in FIG. 5, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred, to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independently of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 130 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 may comprise a camera 191 that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Also shown in FIG. 1 is an audio receiver/microphone 193 that provides input to the processor 122 based on audio that is detected, such as a user providing audio input to the microphone.

Additionally, though now shown for clarity, in some embodiments the system 100 may include a gyroscope that senses and/or measures the orientation of the system 100 and provides input related thereto to the processor 122, and an accelerometer that senses, acceleration and/or movement of the system 100 and provides input related thereto to the processor 122. Still further, and also not shown for clarity, the system 100 may include a GPS transceiver that is configured to receive geographic position information from at least one satellite and provide the information to the processor 122. However, it is to be understood that another suitable position receiver other than a GPS may be used in accordance with present principles to determine the location of the system 100.

It is to be understood that an example client, device or other machine/computer may include fewer or more features than shown on the system 100 of FIG. 1. In any case, it is to be understood at least based on the foregoing that the system 100 is configured to undertake present principles.

Figure 2:
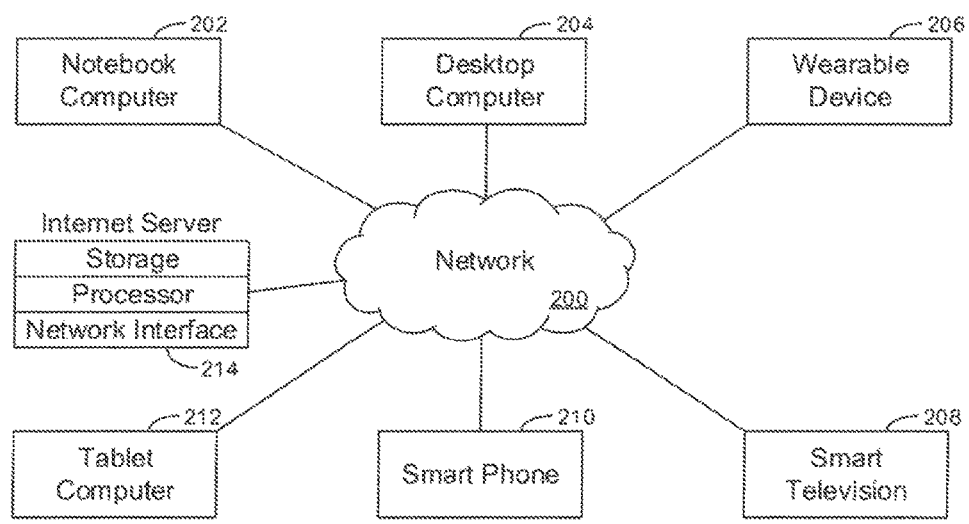
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
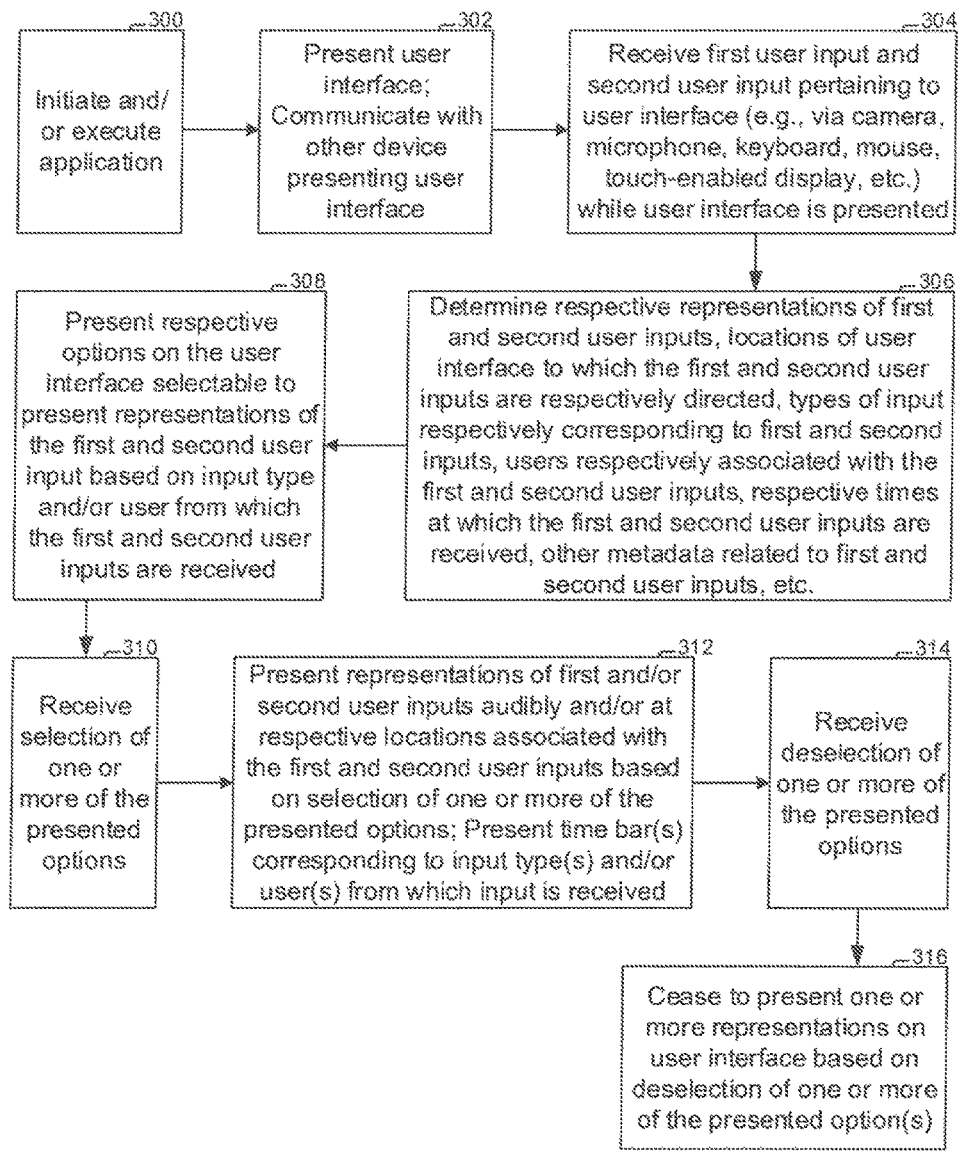
FIG. 3 is a flow chart showing an example algorithm in accordance with present principles.

Referring to FIG. 3, it shows example logic that may be undertaken by a device such as the system 100 (referred to when describing FIG. 3 as the "present device") to toggle between presentation and non-presentation of representations of input based on input type and/or user in accordance with present principles. Beginning at block 300, the logic initiates and/or executes one or more applications for undertaking present principles, such as a collaboration application, drawing application, content, sharing application, canvass application, application(s) for processing various kinds of user input, etc. The logic then moves to block 302 where the logic presents, on at least one display, a user interface (UI) and/or window (collectively referred to below as a "UI" for simplicity) to which user input may be directed and which may be manipulated to display different kinds of content. Also at block 302, the logic communicates with other devices that may also be presenting the UI, such as in its currently-manipulated form in real time so that if a user makes a change to the UI at one device or takes another action thereat, the change may be observed in real time at another device as the change is performed. Thus, it is to be understood that the UI may be simultaneously accessible to multiple users through their respective devices.

In any case, from block 302 the logic moves to block 304. At block 304, while the UI is presented, the logic receives first and/or second user input pertaining to the UI. The first and second user inputs may be received via a device on or in communication with the present device, such as a camera, microphone, keyboard, mouse, touch-enabled display, etc. The logic then moves to block 306 where the logic determines respective representations of the first and second user inputs to present at one or more of the devices also presenting the UI. Also at block 306, the logic may determine locations of the UI to which the first and second user inputs are directed, types of input, respectively corresponding to the first and second inputs, users respectively associated with the first and second user inputs, respective times at which the first and second user inputs are received, and still other metadata related to the first and second user inputs. Also at block 306, data related to these determinations may be stored at a location accessible to all devices that also have access to the UI.

For example, user input may be received via a camera where a gesture in free space is performed with a user pointing at a particular area of the UI (where the area is less than an entire presented area of the UI) without touching the display on which the UI is presented. This user action may be recognized as a gesture input type by executing gesture recognition software that processes images from the camera (and/or data from other devices such as an ultrasound transceiver or another type of image sensor) of the user gesturing the gesture to identify the user's body motion as a gesture toward the UI and hence identify the gesture as gesture input. The location on the UI to which the user is pointing may thus also be determined by executing the gesture recognition software to identify a location on the UI corresponding to where the user is pointing. Furthermore, facial recognition software may be executed to identity a particular user to associate with the pointing based on one or more images of the user's face shown in one or more of the images gathered of the user performing the gesture, and in some embodiments the device to which the user input is directed may be used to identify the user based on the user being associated with that particular device. A time at which this user input is received may also be recorded based on the current time of day during which the user input is received. The representation of the input which is to be presented may also be identified based on the input being identified as gesture input and/or based on the particular kind of gesture (in this case, pointing) being performed, such as by accessing and finding a match in a data table correlating input of the gesture type, and/or correlating particular types of gestures, with visual representations, icons, images, etc. to be presented at the identified location on the UI to which the gesture is directed to represent that a user gestured at that location of the UI.

As another example, user input may be received via a camera where a user stares, looks, and/or gazes at a particular location of the UI, such as for at least a threshold amount of time, where looking at the UI such as for the threshold amount of time may be identified as eye input pertaining to the UI. This user action may be recognized as an eye input type by executing eye tracking software that processes images from the camera of the user looking at the UI to identify the user's direction and depth of gaze as being toward the UI (e.g., based on pupil orientation, and pupil characteristics such as diameter) and hence identify the looking as eye input. The location on the UI to which the user is looking may thus also be determined by executing the eye tracking recognition software to identify a location on the UI corresponding to where the user is looking. Furthermore, facial recognition software may be executed to identify a particular user to associate with the looking based on one or more images of the user's face shown in one or more of the images gathered of the user looking at the UI, and in some embodiments the device to which the user input is directed may be used to identify the user based on the user being associated with that particular device. A time at which this user input is received may also be recorded based on the current time of day during which the user input is received. The representation of the input which is to be presented may also be identified based on the input being identified as eye input and/or based on the particular kind of eye input (such as staring, squinting, eye rolling, etc.) being provided, such as by accessing and finding a match in a data table correlating input of the eye input type, and/or correlating particular types of eye inputs, with visual representations, icons, images, etc. to be presented at the identified location on the UI to which the eye input is directed to represent that a user looked at that location of the UI.

Providing an example for audio input, user input may be received via a microphone where the user speaks while near the device (e.g., within a threshold distance as determined based on input from a camera on the device), where speaking such as from within the threshold distance may be identified as audio input pertaining to the UI based on the user saying something identified as related to the UI. This user action may be recognized as an audio input type by executing voice recognition and/or word association software that processes input from the microphone of the user speaking to identify key words that are spoken that are also presented on the UI and/or otherwise associated with the UI (e.g., associated with metadata related to the UI) and hence identify the speaking as audio input related to the UI. The location on the UI to which the audio input pertains may thus also be determined by executing the voice recognition and/or word association software to identify a location on the UI corresponding to the audio input based on, e.g., key word association of the spoken input corresponding to text presented or metadata associated with the particular location. Furthermore, facial recognition software may be executed to identify a particular user to associate with the audio input based on one or more images of the user's face shown in one or more of the images gathered of the user while speaking, and in some embodiments the device to which the user input is directed may be used to identify the user based on the user being associated with that particular device. A time at which this user input is received may also be recorded based on the current time of day during which the user input is received. The representation of the input which is to be presented may also be identified based on the input being identified as audio input and/or based on the particular kind of audio input (such as a command, a comment, an exclamation or other voice inflection, etc.) being provided, such as by accessing and finding a match in a data table correlating input of the audio input type, and/or correlating particular types of audio inputs, with visual representations, icons, images, etc. to be presented at the identified location on the UI to which the audio input is directed to represent that a user spoke regarding that location of the UI. Notwithstanding, it is to be further understood that in some embodiments, the representation of the user input may be an audible playback of a recording of the audio input that was received and stored at the user's device and/or elsewhere.

As yet an example that may be used in accordance with the logic of FIG. 3 and this time for touch input, user input may be received via a user touching an area of a touch-enabled display presenting the UI where touching if directed to an area of the display presenting the UI may be identified as touch input pertaining to the UI based on the user touching the UI. This user action may be recognized as a touch input type based on the display, while undergoing touch contact, having a change in resistance, capacitance, pressure, etc. at an area presenting the UI and hence identify the touching as touch input related to the UI. The location on the UI to which the touch input pertains may thus also be determined by identifying the location of the display being touched (e.g., in Cartesian coordinates) and the corresponding portion of the UI presented at that location. Furthermore, facial recognition software may be executed to identify a particular user to associate with the touch input based on one or more images of the user's face shown in one or more of the images gathered of the user while touching the display, and in some embodiments the device to which the user input is directed may be used to identify the user based on the user being associated with that particular device. A time at which this user input is received may also be recorded based on the current time of day during which the user input is received. The representation of the input which is to be presented may also be identified based on the input being identified as touch input and/or based on the particular kind of touch input (such as continual contact for a threshold amount of time, a momentary tap less than a threshold amount of time, a sliding action, a drawing action, etc.) being provided, such as by accessing and finding a match in a data table correlating input of the touch input type, and/or correlating particular types of touch inputs, with visual representations, icons, images, etc. to be presented at the identified location on the UI to which the touch input is directed to represent that a user touched that location of the UI.

Similar methods may be used for text input (e.g., letters entered via a keyboard) to the UI and/or object insertion input (e.g., a paste command received via a mouse to paste an image or object), mutatis mutandis, to determine various representations to present, locations of the UI associated with these user inputs, types of input associated with these user inputs, users to associate with these inputs, times at which these inputs are received, etc. Furthermore, it is to be understood that various determinations as disclosed herein may be used for more than one kind of input that is received, such as determinations that user input pertains to a UI being made based on a user looking at the UI while at least a portion of non-looking user input is received, based on a user gesturing toward the UI while at least a portion of non-gesture input is received, based on a user speaking audio containing at least one word that pertains to the UI while non-audio input is received, based on a user touching a portion of the UI while at least a portion of non-touch user input is received, based on receiving at least a portion of the user input while the UI is presented, etc. For example, a user may exclaim "I like that!" or "This idea is interesting" while looking and/or touching a particular area of the UI, and therefore a particular location of the UI may be identified to associate with the audio input based on where the user was looking and/or touching while the audio input was received.

Continuing the description of FIG. 3, from block 306 the logic then moves to block 308 where the logic presents respective options on the UI that are selectable to present various representations of the first and/or second user input based on input type for the inputs and/or the user that provided the inputs. Example options will be discussed below in reference to FIGS. 4 and 5. In any case, from block 308 the logic then proceeds to block 310, where the logic receives a selection of one or more of the options presented at block 308, such as via touch input to a touch-enabled display that is directed to a location at which a given option is presented.

From block 310 the logic then proceeds to block 312 where the logic presents representations of the first and/or second user input based on selection of one or more of the options presented at block 310. The representations may be provided audibly over speakers on the device (e.g., if the associated user input was voice input and the voice input was recorded through a microphone) and/or visually on the UI itself at locations associated with respective inputs. Also at block 312, the logic may present a time bar corresponding to the selected options that enables a user to select and playback a sequence of inputs beginning at a point specified by the user (e.g., such as using a slider on the time bar). Example time bars and sliders will be described further below in reference to FIGS. 4 and 5.

Still in reference to FIG. 3, from block 312 the logic moves to block 314. At block 314 the logic receives a deselection of one or more of previously-selected options. Responsive to receipt of the deselection(s) at block 314, the logic then moves to block 316 where the logic ceases to present (and/or removes from presentation) one or more representations of the user inputs previously represented audibly and/or visually on the UI. However, note that in other embodiments at block 316, rather than ceasing to present the representations, the logic may render one or more representations relatively more opaque and/or grayed out than how they are presented when their respective options were selected.

Figure 4:
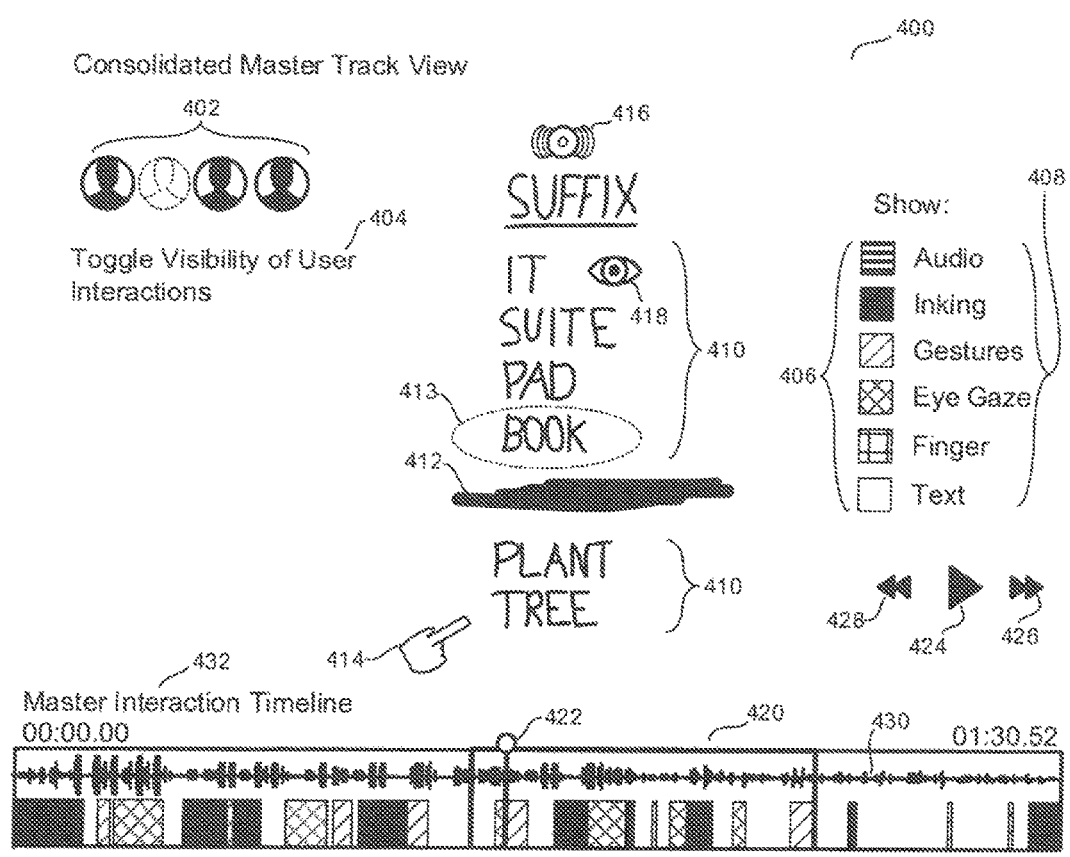
FIGS. 4-6 are example user interfaces (UI) in accordance with present principles.

Continuing the detailed description in reference to FIG. 4, it shows an example user interlace (UI) 400 in accordance with present principles. The UI 400 may be, for example, a drawing space, a clipboard, a virtual white board, a digital content creator, and/or a virtual collaboration space at which multiple users may provide input to the UI that is received by different respective devices that the users are using, where all of those inputs are representable on the UI at each of the different devices (e.g., simultaneously) that presents the UI. They may be representable on each of the different devices by employing cloud computing to transmit and store data that is to be shared among the devices so that the data may be accessed by the devices at the cloud computer, and/or by using a coordinating server that hosts a service for coordinating receipt of inputs, presentation of alterations to the UI (e.g., insertion of an image), and presentation of input representations. Thus, it is to be understood that such a cloud computer or server may execute some or all of the determinations and logic steps disclosed herein, such as those described in reference to FIG. 3 above.

As may be appreciated from FIG. 4, a version of the UI 400 entitled "Consolidated Master Track View" is shown. The UI 400 includes a first set of options 402 selectable to present presentations of user input in accordance with present principles based on which user provided the input. Each of the options 402 may be associated with a different user and may be selectable to configure the UI to show representations of input from that respective user. Furthermore, each of the respective options may have features distinguishable from the others to represent the different users, such as having/showing different images and/or avatars for the users, and/or each of the options being presented in a different color (and hence associated representations may be presented in this same color for each respective option to respectively indicate that they pertain to user input from a particular user associated with that color). As may be appreciated from FIG. 4, three of the four options 402 that are shown, are bolded to indicate that they are currently selected, while the second one from the left is grayed out to indicate that it is currently deselected. Instructions 404 may also be provided instructing a user to toggle visibility of various users' interactions with the UI 400 via selecting or deselecting one or more of the options 402.

As may also be appreciated from FIG. 4, the UI 400 also includes a second set of options 406 selectable to present representations of user input in accordance with present principles based on user input type. Each of the options 406 may be associated with a different type of user input and may be selectable to configure the UI to show representations of input associated with that respective user input type. As may be appreciated from FIG. 4, each of the options 406 (shown as selectable boxes) may have an indication 408 adjacent thereto that indicates the input type associated with the respective option. Furthermore, each of the options, when selected such as the top three are as shown in FIG. 4, may present different patterns (e.g., a grid pattern, or diagonal lines) and/or different colors therein to not only indicate that they have been selected, but also to indicate, at other locations where representations of the input of the respectively selected input type are presented, that the representations are associated with input of the selected type based on the representations being presented with the same pattern and/or coloring as shown in the selected option 406. Options 405 that are not selected are may be left white in color and/or have no pattern other than solid white.

FIG. 4 also shows plural representations 410 which are understood to be representations of "inking" input, which in one embodiment may be tracings of handwriting input provided, using a stylus to contact the display, to the locations of the UI 400 at which the representations 410 are presented. The inking input representations 410 are colored solid black to match the color and pattern of the shading of the option 406 associated with input of the inking type.

In addition to the foregoing, the example UI 400 also shows a representation 412 of gesture input which may be a tracing of areas sequentially pointed to using gestures in free space. The gesture input representation 412 is colored solid gray to match the color and pattern of the shading of the option 406 associated with input of the gesture type. Note that representations in accordance with present principles may also, based on input type and/or user, have different color saturation levels and/or tones as well.

An oval representation 413 is also presented on the UI 400. The representation 413 is understood to be colored yellow to highlight an area that a user is currently looking at, and thus it is to be understood that users at other devices also presenting the UI 400 in real time may also see this representation 413 at their devices.

Other examples of representations will now be described, and it is to be understood that they will be described without also describing the colors and/or patterns which they may have but still understanding that these colors and/or patterns may be used for one or more of the representations to the described below to denote they are respectively associated with different ones of the options 402, 406 that are selected. In any case, an icon 414 is one example of a representation of user input, and in this particular case an image of a hand with a finger pointing to a particular location of the UI denotes that free space gesture input was provided by something like pointing toward the location indicated by the representation or waiving both bands in free space while talking about the words presented at the location. If a person were to select (e.g., via a touch or mouse click) the icon 414, in some embodiments the device may automatically without further user input present other data related to the associated gesture and/or other input received at and around the time of the gesture. For example, selection of the icon 414 may cause a pop-up window to be presented in an area of the UI 400 not already presenting other content, where the pop up window will play back the associated gesture as a video based on images of the gesture that were gathered while the gesture was being performed. Audio that was gathered during this time may also be presented so that the gesturer's speaking while the gesture was being made may also be heard.

An icon 416 that is understood to be a speaker with sound waves emanating therefrom is also shown in the UI 400. The icon 416 is understood to be presented adjacent to the location of the UI 400 presenting the word "Suffix" to denote that audio input was received from a user that pertained to this word. If a person were to select the icon 416, the device may automatically without further user input present data related to the associated audio input and/or other input received at and around the time of the audio being spoken. For example, selection of the icon 416 may configure the device to play-back a recording of the audio and also show a video of the user speaking the audio based on images of the user that were gathered while the audio was being spoken.

The UI 400 of FIG. 4 also shows an icon 418 that is understood to be an eye. The icon 418 is understood to be presented adjacent to the location of the UI 400 presenting the letters "IT" to denote that a user looked at the letters for at least a threshold amount of time. If a person were to select the icon 418, the device may automatically without further user input present data related to the associated eye input and/or other input received at and around the time of the eye input. For example, selection of the icon 418 may configure the device to play back audio of what was said by the user while the user was looking at the location, and also show a video of the user speaking and/or providing the eye input, based on images of the user that were gathered while the user was providing the eye input.

Still other icons may be presented for other types of input such as icons of finger tips and/or finger prints being presented for finger contact input, icons of pens being presented for stylus and/or "inking" input, and icons of hearts for mood input. The foregoing icons may also be selectable to present data related to the associated input and/or other input received around the time of receipt of the associated input, as may be various portions of the representations 410 and/or any images or other objects inserted into the UI 400 (e.g., pasted into the UI 400). Furthermore, it is to be understood that while some of representations of input such as the foregoing icons are disclosed as being presented proximate to (e.g., within a threshold distance of) areas of the UI 400 to which the respective inputs are directed, in some embodiments these representations may have at least portions thereof overlaid on and/or presented at the locations themselves.

Describing the mood input referred to above, it is to be understood that images of a user and/or audio from the user may be used to determine a mood, demonstrative body movement, and/or posture of the user using, e.g., input from a 3D imager and mood recognition software, posture recognition, software, key word software, pupil analysis software and/or software for evaluating facial expressions. For example, different icons may be presented based on whether a user is identified as appearing, engaged or disengaged while looking at a particular portion of the UI 400 and/or while participating in a conversation with other users of the UI 400 about a particular portion of the UI 400. If a user is determined to be interested or engaged in a conversation taking place, an icon of a light bulb may be presented on the UI 400 at a location presenting content that is befog discussed and furthermore this user input of engagement may be tagged and the associated data stored for future presentation.

Still describing FIG. 4, toward the bottom of the UI 400 may be a time line and/or time, bar 420 showing blocks at the bottom thereof that are color-coordinated to match respective ones of the options 402 and 406, and/or respective representations associated with the options 402, 406. It may therefore be determined by looking at the time bar 420 various times that various types of input were received, and/or from what users based, on the colors of the associated blocks. The duration of the user input may be determined based on the horizontal length of the block along the tune bar. The slider 422 that is shown may then be moved back and forth along the time bar 420 to various times in manipulation of the UI 400, and then, by selecting play button 424 once the slider 422 is at a particular past time along the bar 420, representations of all selected user inputs received from that time and forward, may sequentially be presented in chronological, order at the same time rate as the input was received (or, in other embodiments, at an faster time elapsed rate). Also note that presentation of representations may be "fast forwarded" and "rewound" through by respectively selecting the last forward, button 426 and the rewind button 428.

Still, describing the time bar 420, also note that an audio wave pattern 430 is shown. This pattern denotes audio that was spoken at the respective time associated with that point of the time bar. Thus, by moving the slider 422 to a desired time as denoted in the time bar 420 and then selecting the button 424 to initiate playback, a recording of the audio input from that point forward may be presented. For completeness, also note that at respective ends of the bar 420 are respective start and end times, from left to right, of the sequence of manipulation of the UI.

The bar 420 in the example, shown in FIG. 4 has been titled 432 "Master Interaction Timeline" because of how many different types of user input are indicated as occurring as shown. However, as may be appreciated from FIG. 5, plural time bars 500 may be presented in other instances, with each respective time bar 500 being associated with a different user via options 502 similar in function and configuration to the options 402 in that they may be respectively associated with inputs from different users and selectable to present representations of inputs from the different users. An "all" selector 504 is also shown that is selectable to present representations of inputs from all users that have provided them.

Note that the time bars 500 also respectively show blocks at different points along the time lines represented by the bars 500 that are color-coordinated to match respective user inputs of different types corresponding to the options 406, and/or respective representations associated with the options 406. The length of the bars may be associated with the duration of the user input. It may therefore be determined by looking at each of the time bars 500 various types, times, and durations of user input from each associated user. The slider 422 may then be moved back and forth collectively along the time bars 500 (since, e.g., any one vertical segment across the bars 500 represents the same point in time) to a particular time represented by the bars 500, and then by selecting play button 424, representations of all selected user inputs received from that time and forward may sequentially be presented at the same time rate as those inputs were received.

Also note that respective time bar 500 at the bottom that is associated with all users has an audio wave pattern therein that may be similar in function and configuration to the pattern 430 described above. Notwithstanding, note that the other time bars 500 may have similar audio wave patterns to respectively indicate audio input received by that respective user through time.

Still describing FIG. 5, and although not shown for clarity, a selector may be presented on the UI 400 that is selectable for each user, at their respective device, to toggle between the view of the UI 400 shown in FIG. 4 (the "Master Interaction View") and the view of the UI 400 shown in FIG. 5 (the "Multi-track View"). Also note for completeness that when manipulating the time bar 420 or bars 500 as described herein, representations such as the icons 414-418 may not be constantly presented but may be presented based on when their respective user input was received so that they are not presented until playback in the timeline reaches the point at which the user input corresponding to each of the icons 414-418 was received, and/or until the slider is moved to at or to the right of that point even if playback is not subsequently initiated based on selection of the button 424.

Figure 6:
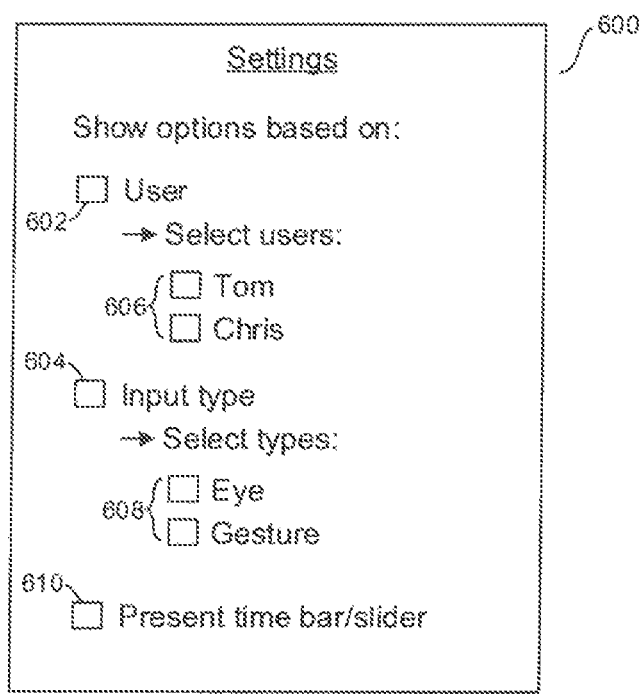

Before describing FIG. 6, it is to also be understood in accordance with present principles that eye contact between participants such as when in the same room may be detected by the user's respective devices, as may talking between users that occurs in person. This input may also be recognized as pertaining to the UI 400 in accordance with present principles even if the users are looking at each other rather than their devices, and therefore representations of such eye and audio input may also be presented.

Now describing FIG. 6, it shows an example settings UI 600 that may be presented on a device in accordance with present principles. The UI 600 includes options 602 and 604 respectively selectable to enable respective presentation of options on a UI (such as the UI 400) respectively similar to the options 402 and 406. Thus, selection of the option 602 may cause the options 402 to be presented, in one example, when the UI 400 is next presented after the UI 600 is presented. Selection of the option 604 may cause the options 406 to be presented when the UI 400 is next presented after the UI 600 is presented. Also note that options 606 and 608 may be selected to only show options respectively similar to the options 402 and 406 respectively for particular users and/or particular input types.

Still describing the UI 600, also shown is an option 610. The option 610 is selectable to configure the device to present a time bar and/or slider when presenting a UI such as the UI 400. Thus, selection of the option 610 may cause the time bar 420 and slider 422 to be presented, in one example, when the UI 400 is next presented after the UI 600 is presented.

It may now be appreciated that present principles provide for a collaboration canvass and/or digital whiteboard of sorts. The whiteboard can accept digital ink, typeset text and inserted objects. The whiteboard also allows for layering and channeling of inputs based on types of input and users from which the inputs were received. This channeling of input allows what has been captured by one or more devices during a collaboration session to later be reviewed in various ways. As an example, the exact tracing of ink flow, gaze patterns, eye dwells, and recorded voice input may be recorded for all contributors involved and optionally viewed (when applicable) as overlays to the visible content created by the group (such as the typeset text and images themselves). The present application thus provides methods that allow any authorized users to review all available inputs collected for a given collaboration session by the toggling on/off the desired "input channels" for the respective participants. An interaction timeline may also be employed for all input channels recorded from all contributors, which temporally maps the chronology of the activity as well as provides a method to "scrub" through the collaboration by visually pinpointing input types and timeframes of interest. Furthermore, present principles allow collaborators to see where each other was looking most often during the collaboration, and to playback the exact order of ideas as they were conveyed via digital ink, audio input, etc, from multiple contributors within a given timeframe. Recording of an input channel may in some instances involve time stamping of any entry in that channel, recording of certain elements of that respective input type and as applicable, associating a location of that input to respective locations within the visible collaboration space. Further still, settings for allowed and preferred input channels may established by any contributor, as well as an authorized administrator of the collaboration session. These settings may apply to what is recorded for each user and/or what is observable by different users with different respective administrative rights.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular TOGGLING BETWEEN PRESENTATION AND NON-PRESENTATION OF REPRESENTATIONS OF INPUT is herein shown and described in detail, it is to be understood that the subject matter which is encompassed by the present application is limited only by the claims.

What is claimed is:

1. A first device, comprising:
    at least one processor;
    a display accessible to the at least one processor; and
    storage accessible to the at least one processor and
        bearing instructions executable by the at least one
        processor to:

present a user interface (UI) on the display;
present at least a first option on the display and a second option on the display, the first option being selectable to present, at the first device, at least a first representation of first user input of a first input type, the second option being selectable to present, at the first device, at least a second representation of second user input of a second input type, the first user input and the second user input pertaining to the UI, the first input type being different from the second input type;
responsive to a first word spoken by a user being identified, correlate the first word to a second word, the second word already presented as part of the UI prior to the first word being identified;
record the first word being spoken by the user, the first word being recorded without additional user input that is eye input and without additional user input that selects a button presented on the display; and
responsive to the correlation, present a graphical object adjacent to the second word, the graphical object indicating the first word as being spoken and indicating available playback of the speaking of the first word.

2. The first device of claim 1, wherein the first input type is eye input, wherein the first representation is presented on the UI, and wherein the first user input is determined to pertain to the UI based at least in part on a determination one or more of: that a user gestures toward the UI while at least a portion of the first user input is received, that at least a portion of audio received at the first device while at least a portion of the first user input is received contains at least one word that pertains to the UI, that a portion of the UI is touched while at least a portion of the first user input is received.

3. The first device of claim 1, wherein the instructions are executable by the at least one processor to:
present a selector on the display selectable to sequentially present in chronological order various representations of input based on the sequence in which various user inputs respectively associated with the various representations of input are received.

4. The first device of claim 1, wherein the UI is simultaneously accessible to multiple users through different devices, wherein the first user input and the second user input are receivable at the different devices, and wherein the first representation and the second representation are presentable at the different devices.

5. The first device of claim 1, wherein the instructions are executable by the at least one processor to:
present at least a first icon that is also associated with the first input type, the first icon comprising a graphic other than text that visually indicates the first input type, the first icon associated with one item presented on the UI but not others, the first icon being selectable to initiate playback of input associated with the item, the first icon being different from the first and second options.

6. The first device of claim 1, wherein the graphical object comprises an icon, the icon being selectable to initiate playback of the speaking of the first word.

7. The first device of claim 1, wherein the graphical object comprises an image of the user.

8. The first device of claim 7, wherein the image of the user is presented responsive to identification of the user as speaking the first word.

9. The first device of claim 1, wherein presenting the graphical object adjacent to the second word comprises presenting the graphical object within a threshold distance of the second word.

10. The first device of claim 1, wherein the first word and the second word are the same word.

11. A method, comprising:
presenting a user interface (UI) on a display of a device;
toggling between presentation of representations of input at the device and non-presentation of the representations of input at the device based on manipulation of at least one selector presented on the display, wherein the input that is represented is associated with the UI;
responsive to identifying a first word spoken by a user, correlating the first word to a second word, the second word already presented as part of the UI prior to the first word being identified;
recording the first word being spoken by the user, the first word being recorded without additional user input that is eye input and without additional user input that selects a button presented on the display; and
responsive to the correlation, presenting a graphical object adjacent to the second word, the graphical object indicating available playback of the speaking of the first word.

12. The method of claim 11, wherein the graphical object is selectable to initiate playback of the speaking of the first word.

13. The method of claim 11, wherein the graphical object comprises an image of the user.

14. The method of claim 11, wherein presenting the graphical object adjacent to the second word comprises presenting the graphical object within a threshold distance of the second word.

15. The method of claim 11, wherein the first word and the second word are the same word.

16. An apparatus, comprising:
a first processor;
a network adapter; and
storage bearing instructions executable by a second processor for:
presenting a window on a display of a device accessible to the second processor; and
presenting at least a first selector on the display and a second selector on the display, the first selector being selectable to present, at the device, at least a first representation of first user input from a first user, the second selector being selectable to present, at the device, at least a second representation of second user input from a second user different from the first user, the first user input and the second user input pertaining content presented in the window;
responsive to identifying a first word spoken by a user, correlating the first word to a second word, the second word already presented as part of the window prior to the first word being identified;
recording the first word being spoken by the user, the first word being recorded without additional user input that is eye input and without additional user input that selects a button presented on the display; and
responsive to the correlation, presenting a graphical object adjacent to the second word, the graphical object indicating the correlation;
wherein the first processor transfers the instructions over a network via the network adapter.

17. The apparatus of claim 16, wherein the correlation is performed responsive to association of the first word with metadata related to a location at which the second word is presented.

18. The apparatus of claim 16, wherein the graphical object indicates available playback of the speaking of the first word and is selectable to initiate playback of the speaking of the first word.

19. The apparatus of claim 16, wherein the graphical object indicates the second word as being spoken by the user, the first and second words being the same word.

20. The apparatus of claim 16, wherein the graphical object comprises an image of the user.

* * * * *